United States Patent [19]

Tsviatko et al.

[11] Patent Number: 4,943,371
[45] Date of Patent: Jul. 24, 1990

[54] APPARATUS FOR REDUCING PITTING IN COPPER WATER PIPES

[76] Inventors: Ganev Tsviatko, Torbjrönsgatan 34, S-753 35 Uppsala; Fallman Göran, Timmermansgatan 34, S-753 33 Uppsala, both of Sweden

[21] Appl. No.: 942,415

[22] PCT Filed: Mar. 27, 1986

[86] PCT No.: PCT/SE86/00145
§ 371 Date: Nov. 24, 1986
§ 102(e) Date: Nov. 24, 1986

[87] PCT Pub. No.: WO86/05772
PCT Pub. Date: Oct. 9, 1986

[30] Foreign Application Priority Data

Mar. 27, 1985 [SE] Sweden ................... 8501525

[51] Int. Cl.$^5$ .............................................. C02F 5/00
[52] U.S. Cl. ................................. 210/101; 210/134; 210/143; 210/434; 210/662
[58] Field of Search ............... 210/662, 687, 790, 143, 210/190, 191, 264, 287, 424, 428, 434, 93, 96.1, 101, 134; 364/140, 500, 502; 137/89, 101.19, 560, 625.29, 625.3, 625.4, 3, 9

[56] References Cited

U.S. PATENT DOCUMENTS

| 3,217,883 | 11/1965 | Griswold | 210/434 |
| 4,328,549 | 5/1982 | Avery | 364/476 |
| 4,426,294 | 1/1984 | Seal | 210/662 |
| 4,469,602 | 10/1984 | Seal | 210/662 |
| 4,490,249 | 12/1984 | Seal | 210/89 |
| 4,536,845 | 8/1985 | De Vale | 210/143 |
| 4,645,595 | 2/1987 | Kim et al. | 210/190 |

FOREIGN PATENT DOCUMENTS 3003676 8/1981 Fed. Rep. of Germany .
2126209 3/1984 United Kingdom .

OTHER PUBLICATIONS

Comsumers' Research Magazine, 10/83, p. 2, "Softened Water".

Primary Examiner—Ivars Cintins
Attorney, Agent, or Firm—Morgan & Finnegan

[57] ABSTRACT

Method and an apparatus for producing water with a constant degree of hardness. Hard, cold water is mixed with softened cold water to form a mixed flow with a predetermined hardness degree (of about 6 German hardness degree) resulting from the proportions between the two mutually mixed flows. The apparatus includes a shunt pipe (4), a mixing valve (5) and a flow meter (7). A control circuit (8) controls the setting of the mixing valve (5) in response to the prevailing flow.

6 Claims, 1 Drawing Sheet

APPARATUS FOR REDUCING PITTING IN COPPER WATER PIPES

The invention relates to a method and apparatus for reducing pitting in copper water pipes.

The term "pitting" is intended to describe local corrosion in patches on the inside of the pipe or the like. Hemispherical pits occur in the patches. In the most extreme cases, a hole is corroded right through the copper water pipe wall and leakage results.

The causes of pitting have not been entirely explained. Factors of significance in relation to the occurrence of pitting are; the acidity of the water (pH value): its bicarbonate content, its temperature, and its degree of hardness. If the pH value and the bicarbonate content are too low, building up of a protective depositi of copper hydroxycarbonate inside a pipe is made impossible. In order to prevent pitting it is therefore being proposed that the bicarbonate content of the water should be raised by treating it with lime and carbon dioxide, see VVS and Energi 12, 1983, "Gropfrätning av typ III i kallvattenledningar av koppar" (Type III pitting in cold water pipes), by E. K. Lindman and M. Linder, p. 64–66. For hard water it has also been proposed to increase the pH value of the water to over 7.5 (preferably 8.0–8.5) - see VVS, 3, 1972, "Korrosionshärdigheten hos vattenledningar av koppar" (Corrosion resistance in copper water pipes), by E. Mattsson, p. 47–53. Such raising of the pH value takes place, for example, by alkalinization of the water at a waterworks, using sodium hydroxide, calcium hydroxide (milk of lime) or sodium carbonate (soda).

In areas with hard water, it is usual to use softening filters for softening the water. The term "hard water" here used to refer to water having a calcium content exceeding about 70 mg/1. Hard water forms lime deposits in pipes, valves and sanitary ware, as well as causing difficulties in the use of soap detergents. In extreme cases, the lime deposits on the inside of the pipes grow to such an extent that they block the pipes. On the other hand, softened water, particularly completely softened water, also results in disadvantages since copper dissolves in the water. In extreme cases, this can give rise to forms of copper intoxication, particularly diarrhoea in babies. Such a release of copper is encouraged in acidic water.

Softened water, with a high content of free carbonic acid (which attacks marble), is also considered to contribute to pitting in copper pipes.

The technical background of the invention is the following. To avoid lime deposits in pipework and apparatus, when the water has too great a degree of hardness, usually greater than 8° dH, it is necessary to use a softening filter. The calcium ions, causing the previously mentioned deposits, are exchanged for sodium ions in this filter. This means that the water leaving the filter does not contain any calcium ions at all. Since there are no calcium ions, no protective layer of lime in pipework and apparatus can be formed.

Since water often contains substances which attack the metal —usually copper—from which pipework and apparatus are made, corrosion damage occurs (in the form of pitting) when the water is completely softened to a hardness of 0° dH. This will in time lead to leakage in pipework and/or apparatus.

There is here a technical problem. On the one hand, if water, with a large degree of hardness is not softened, there will be deposits of lime which will block up pipes and apparatus. On the other hand, if softening is performed in a softening filter and water is obtained without calcium ions, the aforementioned corrosion damage will occur. It is thus desirable to produce water which has a sufficient degree of hardness (i.e. a calcium content which is suffiently large to form a protective calcareous layer on the interior of the pipework), yet which is not large enough to cause growing deposits to block up pipework and/or apparatus. It has hitherto not been possible, to solve this problem in a satisfactory way.

The Applicant is not the first to discover that a mixture of softened and hard water can give protection against the undesired depositing of copper salts. However, the Applicant is the first to find a method of producing water with a constant degree of desired hardness, independent of flow variations.

The invention is suitably applied to pipework serving dwellings or dwelling areas, where the water consumption varies during the course of the day. In this application, the desired proportion of hard water is added to the softened water so that the mixed water has the desired degree of hardness. When the mixed water flow varies, the partial flows, i.e. the flow of softened water and the flow of hard water that are mixed together, are regulated so that the required balance is maintained irrespective of the variation in the flow of the mixed water. In other words, mixture takes place in proportion to flow. After a longe time in use, the insides of the pipes have a thin coating: this coating is not soluble in water, is very resistant and appears to serve as an inhibitor (partly against pitting and partly against the release of copper).

The invention will now be described in detail below, in connection with the accompanying drawings, where:

Figure 1:
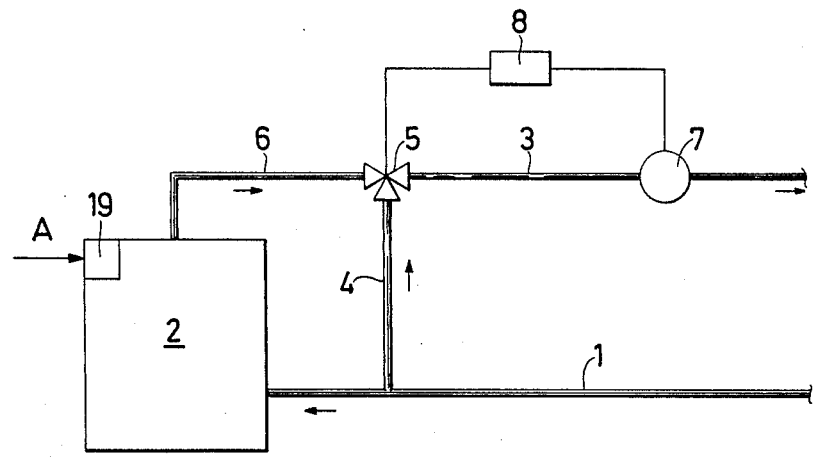
FIG. 1 illustrates the inventive principle.

FIG. 1 illustrates the invention applied to a house, where the water is supplied via the pipe 1 and after softening in a softening filter 2 goes through a pipe 3 to which consumption devices are connected. The softening filter comprises, in a manner known per se, a container containing an ion exchange mass of small, round grains. These grains have the capacity of binding positive ions. The water is the pipe 1, having a high content of calcium and magnesium ions, is softened in the filter so that these ions are exchanged for sodium ions which are bonded to the grains in the ion exchange mass. The concentration of calcium and magnesium ions—which tend to precipitate in solid form as carbonates and become deposited on the inside of pipes, cooking vessels, sanitary ware, etc.—is thus decreased in this way. When the sodium ions of the ion exchange mass have been consumed, regeneration takes place by pumping an approximately 10% sodium chloride solution through the ion exchange mass, causing the sodium ions to bond to the grains in the ion exchanger.

In accordance with the present invention, a shunt pipe 4 is arranged to bypass the softening filter 2. This pipe extends between the pipe 1 and a mixing valve 5 of a known kind. The water which goes to the consumption devices via the pipe 3 thus comprises a mixture of a flow of softened water—through the pipe 6 from the softening filter 2—coming to one input of the mixing valve, and a flow of unsoftened water coming from the water in the pipe 1. The proportion between these to mutually mixed flows is selected so that the water in the pipe 3 is normally soft to normally hard, i.e. it has approximately 5° dH (dH=German degrees of hardness). The result of the mixture of unsoftened water with the softened water, is that a coating is formed on the inside of the copper pipes 3 and on the remaing pipes connected to the consumer devices and to the pipe 3. The nature of this protective coating has been given above.

The flow in the pipe 3 is normally not constant, and varies during a twenty-four hour period. To keep the proportions between the flows in the pipes 4 and 6 constant (and independent of consumption) there is arranged in accordance with the invention, a flow-dependent control of both flows in the pipes 4 and 6, so that the proportion between these flows is maintained. For this purpose, a flow meter of a conventional kind is arranged in the pipe 3 to send electrical signals to a control circuit 8 which controls a setting means 9 (see FIG. 2) at the mixing valve 5. The means thus regulates the amount of unsoftened water in the pipe 4. The setting means is of a conventional kind and is therefore not described in detail.

Figure 2:
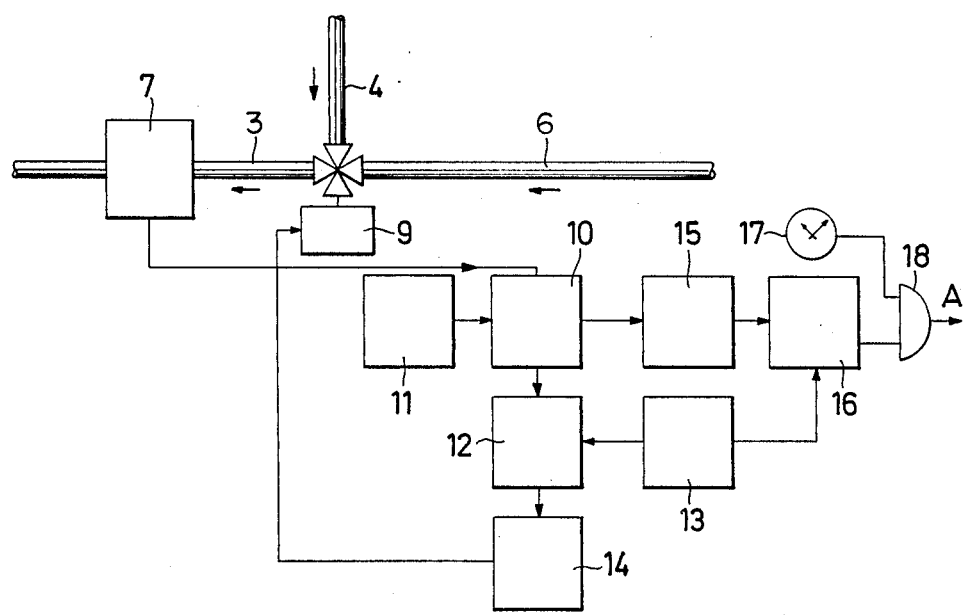
FIG. 2 is a block diagram of a control circuit included in the apparatus in accordance with the invention.

A more detailed block diagram of the control circuit 8 is illustrated in FIG. 2. In this embodiment the flow meter 7 is a water meter with an impulse transducer of the type sold under the name "SVNV" by Svensk Värmemätning AB, Stockholm. The mixing valve 5 is a three-way seat valve, sold with the designation "VXG 41" by Landis & Gyr. As will be understood, when such a valve is operated in one direction, one flow is restricted while the other is increased. When operated in the reverse direction, the first flow is increased, while the other flow is restricted. The setting means is of the electrohydraulic type and is sold by the same firm, with the designation "SKB". The flow meter 7 sends pulses with a repetition frequency proportional to the flow. The pulses are counted in a counter 10 for a predetermined time period (in the illustrated example, this period is 1 min.), determined by a time control 11. At the end of the time period, the count on the counter 10 is compared in a comparator 12 with a reference value stored in a memory circuit 13. The counter 10 is then set to 0. The output signal from the comparator 12 is such that if the counted number of pulses does not reach the reference value, a signal is given restricting the amount of hard water mixed. Conversely, if the counted value exceeds the reference value, the circuit 12 sends a signal increasing the amount if unsoftened cold water, the output signal from the circuit 12 goes to a drive circuit 14 for controlling the adjustment of the mixing valve by the setting means 9.

It is also possible to count the pulses from the flow meter over a longer period of time—e.g. 10 min.—and to compare the count thus formed with a new higher reference value from the memory circuit 13.

An added advantage with the invention is that regeneration of the softening filter 2 can be effected in good time before the sodium ion store of the ion exchange mass is exhausted. The capacity of the ion exchange mass is expressed as its ability to soften a given numer of liters of fresh water. The total number of liters counted by a second counter 15 is compared in a comparator with a reference value corresponding to the filter capacity This reference value is stored—e.g. in the memory circuit 13, and when there is agreement between the values a signal is sent via the output of the compartor 16. The presence of this signal thus indicates that the ion exchange mass needs to be regenerated. For practical reasons, it is not suitable to carry out regeneration when consumption is high—e.g. at midday—and it is thus suitable to do this at night. A schematically illustrated time switch 17 sends via its output an electric signal during the periods in which consumption is expected to be low. The outputs from the time switch 17 and the comparator 16 go to the input of an AND circuit 18 which sends via its output a signal A. This signal goes to the conventional circuit 19 of the softening filter 2 to initiate the regeneration process.

The embodiment of the invention described above may be modified in many ways and be varied within the scope of the inventive concept.

What is claimed:

1. An apparatus for reducing pitting in copper water pipes, comprising:
   a regenerable softening filter, comprising a first inlet connection for accepting unsoftened water and a first outlet connection for discharging softened water;
   a means for mixing softened and unsoftened water, located downstream from said first outlet connection, comprising a second and third inlet connection and a second outlet connection;
   a first pipe means connected to said first inlet connection for introducing unsoftened water to said regenerable softening filter;
   a second pipe means connected to said first outlet connection for conducting softened water from said regenerable softening filter to said second inlet connection of said means for mixing;
   a third pipe means connected to said third inlet connection of said means for mixing, for conducting unsoftened water from said first pipe means, to be blended with softened water from said second pipe means;
   a fourth pipe means connected to said second outlet connection of said means for mixing, for conducting a mixed flow of softened and unsoftened water for final use; and
   a regulating system, located downstream from said means for mixing in said fourth pipe means, for controlling the mixing of said softened and unsoftened water by a hardness degree in said means for mixing, and for controlling the regeneration of said regenerable softening filter.

2. An apparatus as in claim 1, wherein said regulating system comprises:
   a. means for detecting the flowrate of said softened and unsoftened water in said fourth pipe means and for generating a first signal representative of the flowrate of said mixed softened and unsoftened water;
   b. comparative means for accepting said first signal and producing a first output signal when said first signal is compared to a first reference value;
   c. means for accepting said first output signal for varying said means for mixing;
   d. comparative means for accepting said first signal and producing a second output signal when said first signal is compared to a second reference value; and
   e. means for accepting said second output signal for initiating regeneration of said regenerable softening filter.

3. An apparatus as in claim 2, wherein said means for detecting the flowrate of said softened and unsoftened water in said fourth pipe means is a flowmeter.

4. An apparatus as in claim 2, wherein said first reference value is a hardness degree.

5. An apparatus as claimed in claim 2, wherein said means for mixing is a three-way valve.

6. An apparatus as in claim 2, wherein said second reference value is the filter capacity of the regenerable softening filter.

* * * * *

UNITED STATES PATENT AND TRADEMARK OFFICE
CERTIFICATE OF CORRECTION

PATENT NO. : 4,943,371

DATED : July 24, 1990

INVENTOR(S) : Ganev et al

It is certified that error appears in the above-identified patent and that said Letters Patent is hereby corrected as shown below:

ON THE TITLE PAGE

Item [19] "Tsviatko et al" should read --Ganev et al--.

Item [76] Inventors: "Ganev Tsviatko" should read --Tsviatko Ganev--; and "Fallman Göran" should read --Göran Fallman--.

Signed and Sealed this

Thirtieth Day of June, 1992

Attest:

DOUGLAS B. COMER

*Attesting Officer*   *Acting Commissioner of Patents and Trademarks*